(12) United States Patent
Copeland (10) Patent No.: US 11,339,302 B2
(45) Date of Patent: May 24, 2022

(54) COMPOSITION AND METHOD FOR REMOVING A COATING FROM A SURFACE

(71) Applicant: NCH Corporation, Irving, TX (US)

(72) Inventor: Katrell D. Copeland, McKinney, TX (US)

(73) Assignee: NCH Corporation, Irving, TX (US)

(*) Notice: Subject to any disclaimer, the term of this patent is extended or adjusted under 35 U.S.C. 154(b) by 317 days.

(21) Appl. No.: 16/559,046

(22) Filed: Sep. 3, 2019

(65) Prior Publication Data

US 2021/0062019 A1 Mar. 4, 2021

(51) Int. Cl.
*C11D 3/20* (2006.01)
*C09D 9/00* (2006.01)

(52) U.S. Cl.
CPC ................... *C09D 9/005* (2013.01)

(58) Field of Classification Search
CPC .................... C11D 3/43; C11D 1/72
USPC .......................................... 510/201
See application file for complete search history.

(56) References Cited

U.S. PATENT DOCUMENTS

| | | | | |
|---|---|---|---|---|
| 8,828,917 B2 * | 9/2014 | Rieth | .................... | C11D 3/2093 510/138 |
| 2006/0234890 A1 * | 10/2006 | Griese | .................... | C09D 9/005 510/214 |
| 2013/0065809 A1 * | 3/2013 | Savaglio | ................ | C09D 9/005 510/212 |
| 2013/0274166 A1 * | 10/2013 | Savaglio | .................. | C09D 4/00 510/212 |
| 2015/0038391 A1 * | 2/2015 | De Wit | ..................... | C23G 5/06 510/238 |
| 2015/0252302 A1 * | 9/2015 | Rieth | ........................ | A61Q 5/10 514/772 |
| 2015/0315520 A1 * | 11/2015 | Eppler | ..................... | A61Q 1/04 424/64 |

* cited by examiner

*Primary Examiner* — Gregory E Webb
(74) *Attorney, Agent, or Firm* — Scheef & Stone, LLP; Robin L. Barnes (57) ABSTRACT

A stripping composition and method for removing a coating, such as a water-based or oil-based paint or stain, from a surface without requiring the use of methylene chloride. The stripping composition preferably comprises at least one ether, at least one ester, at least one amine, at least one alcohol, and at least one glycoside and does not contain any methylene chloride. Preferred ingredients comprise 1,3 dioxolane, acetic acid methyl ester or a carbonate ester or both, MEA (2-aminoethanol), benzene methanol, an alkyl polyglucoside, and methylcellulose. The stripping composition is applied to a coating for a period of time between 5-10 minutes for most water and oil-based coatings and 20-90 minutes for most epoxy coatings to effectively remove at least 80% and preferably at least 90% of the coating.

18 Claims, 6 Drawing Sheets

COMPOSITION AND METHOD FOR REMOVING A COATING FROM A SURFACE

BACKGROUND OF THE INVENTION

1. Field of the Invention

This invention relates to a composition and method for removing a coating, such as paint or polyurethane, from a surface without requiring the use of methylene chloride.

2. Description of Related Art

There are many prior art "paint stripper" compositions for removing a coating, such as a paint or polyurethane, from a surface. These compositions contain solvents that, when applied to a coated surface loosen or dissolve the coating so that at least most of the coating may be wiped or scraped off the surface. The solvents used in many prior art paint strippers contain methylene chloride, toluene, or xylene that may be toxic or harmful to the environment and to health of users. The U.S. Environmental Protection Agency recently issued a rule, effective in November 2019, banning the use of methylene chloride in paint strippers.

In an effort to reduce health, safety and environmental concerns with these solvents, there are several prior art paint stripper compositions that do not use methylene chloride. For example, U.S. Patent Application Publication No. 2008/0139437 discloses a paint stripper that is free of methylene chloride. The paint stripper composition comprises 1-50% aprotic solvent (preferably acetone), 1-70% of an ether containing compound (dioxolane), an evaporation retarder (such as wax), and 1-50% of a solvent for the evaporation retarder (preferably aromatic hydrocarbons such as xylene). Although the paint stripper in the '437 publication avoids the use of methylene chloride, it still uses solvents, such as xylene and acetone, that are known to be hazardous. It also still requires the use of wax. Although wax is an effective evaporation retarder, it typically requires heating and melting as an additional step in mixing and preparing the stripping composition. There is a need for effective and fast-acting stripping compositions that avoid the use of methylene chloride and other harmful solvents, such as acetone and xylene, to strip coatings and that preferably does not the addition of wax or other evaporation retarder ingredients.

SUMMARY OF THE INVENTION

The compositions and methods of the invention provide an effective way to remove coatings from a surface without requiring the use of methylene chloride, toluene, xylene, acetone, or n-methyl pyrrolidone. According to one preferred embodiment, a stripping composition comprises at least one ether, at least one ester, at least one amine, at least one alcohol, and at least one glycoside and does not contain any methylene chloride. Most preferably such composition also does not include any xylene, toluene, acetone, or n-methyl pyrrolidone. Preferably, a stripping composition comprises around 40-80% total of one or more ethers, 20-45% total of one of more esters, 5-45% total of one or more alcohols (which may include an amino alcohol), and 0.25-17% total of one or more glycosides, all by weight of the composition. More preferably, a stripping composition comprises around 40-80% total of one or more ethers, 20-45% total of more esters, 5-30% total of one or more amines (preferably an amino alcohol), 5-15% total of one or more alcohols (excluding any amino alcohol), and 0.25-17% total of one or more glycosides, all by weight of the composition.

According to another preferred embodiment, the ether comprises dioxolane, more preferably 1,3 dioxolane. According to another preferred embodiment, the ester comprises acetic acid methyl ester or a carbonate ester or both. According to another preferred embodiment, the carbonate ester is dimethyl carbonate.

According to another preferred embodiment, at least one alcohol is an aromatic alcohol, preferably benzene methanol. According to another preferred embodiment, an aromatic alcohol is the only aromatic compound in the composition. According to another preferred embodiment, another alcohol is an amino alcohol, most preferably 2-aminoethanol (MEA).

According to another preferred embodiment, the at least one glycoside is an alkyl polyglucoside. According to another preferred embodiment, butyl glycoside is the only glycoside in a stripping composition. According to another preferred embodiment, at least two glycosides or glucosides are used in a stripping composition.

According to still other preferred embodiments, a stripping composition may optionally comprise a thickener or emulsifier or colorant or a combination thereof. Most preferably, stripping compositions according to preferred embodiments do not include water as a separately added ingredient, although one or more added ingredients may be aqueous.

According to one preferred embodiment of the invention, a method of removing a coating from a surface comprises: (1) applying a stripping composition according to a preferred embodiment of the invention to the coating such as by pouring, wiping, or brushing it on the coating or dipping the coated surface into such composition; (2) allowing such composition to sit on the coating for a period of time of 5-90 minutes depending on the type of coating, and then (3) removing the stripping composition and coating by wiping, scraping, rubbing, or sanding after the composition has been in contact with the coating for the period of time.

The compositions and methods according to preferred embodiments provide an improved environmental, health, and safety profile as compared to prior art stripping products, particularly those containing methylene chloride, which is commonly used for removal of coatings from surfaces. The compositions and methods according to preferred embodiments are also more effective and work faster than many prior art stripping products, and are comparable to, if not better than, methylene chloride products in effectiveness and speed of removal, particularly for water-based coatings.

BRIEF DESCRIPTION OF THE DRAWINGS

The composition and method of the invention are further described and explained in relation to the following drawings.

DESCRIPTION OF THE PREFERRED EMBODIMENTS

According to one preferred embodiment, a stripping composition provides an effective way to remove coatings from a surface without requiring the use of methylene chloride, toluene, xylene, acetone, or n-methyl pyrrolidone. As used herein, the term "coating" refers to any type of pigmented or unpigmented paint, stain, varnish, urethane or epoxy finish applied to a surface to protect the surface or for aesthetic purposes, including oil and water-based formulations, enamels, latexes, primers, basecoats, 2-part finishes, and polyurethane finishes, unless a specific type of such finish is specified. As used herein, the term "surface" means any substrate to which a coating is applied, such as wall, floors, ceilings, exterior siding, masonry, furniture, equipment, wood, metal, glass, ceramic, stone, and plastic materials. As used herein "stripper," "stripping," "strip" or similar terms refer to compositions that are applied (or the act of applying such composition) to a surface having a coating in order to remove or facilitate the removal of the coating from the surface, such as by wiping, scraping, rubbing, or sanding after the composition has been in contact with the coating for a period of time.

According to one preferred embodiment, a stripping composition comprises at least one ether (preferably dioxolane, more preferably 1,3 dioxolane, at least one ester, at least one alcohol, at least one glycoside, and optionally at least one amine. Preferably, a stripping composition comprises around 40-80% total of one or more ethers, around 20-45% total of one of more esters, around 3-45% total of one or more alcohols (which may include an amino alcohol), around 0.25-17% total of one or more glycosides, and optionally around 2-30% total of one or more amines (which may also be an amino alcohol included in the total amount of alcohols), all by weight of the composition. More preferably, a stripping composition comprises around 40-80% total of one or more ethers, around 20-45% total of one of more esters, around 5-30% total of one or more amines (preferably an amino alcohol), around 1-15% total of one or more alcohols (excluding any amino alcohol), and 0.25-17% total of one or more glycosides or glucosides, all by weight of the composition. The preferred amino alcohol, MEA, is a VOC and it is most preferred to use an amount of MEA on the lower end of the above ranges. The preferred other alcohol, benzene methanol, aids in the stripping process, but also acts as a diluent to lower the VOC in the composition. Most preferably, these compositions do not include methylene chloride, xylene, toluene, acetone, or n-methyl pyrrolidone. Most preferably, these compositions also do not include any evaporation retarded ingredients, such as wax.

Preferably, the ester in stripping compositions according to preferred embodiments of the invention comprises acetic acid methyl ester or a carbonate ester or both. According to another preferred embodiment, the carbonate ester is dimethyl carbonate or a propylene carbonate was also used in initial formulations but dimethyl carbonate was more effective. Preferably, a stripping composition comprises around 10-25% of the acetic acid methyl ester, or around 10-20% of the carbonate ester, or both. More preferably, a stripping composition comprises around 15-25% of the acetic acid methyl ester, or around 12-16% of the carbonate ester, or both. Most preferably, a stripping composition comprises both an acetic acid methyl ester and a carbonate ester.

Preferably, the alcohol in stripping compositions according to preferred embodiments of the invention comprises an aromatic alcohol, preferably benzene methanol. Most preferably, an aromatic alcohol is the only aromatic compound in the composition. According to another preferred embodiment, a stripping composition comprises an amino alcohol as a second alcohol (or as the optional amine). MEA or mono ethanolamine is a preferred amino alcohol, but TEA or triethanolamine may also be used. Preferably, a stripping composition comprises around 1-15% of the aromatic alcohol and around 5-30% of the amino alcohol. More preferably, a stripping composition comprises around 5-10% of the aromatic alcohol and around 5-20% of the amino alcohol.

According to another preferred embodiment, the at least one glycoside is a alkyl polyglucoside. According to another preferred embodiment, butyl glycoside is the only glycoside in a stripping composition. According to another preferred embodiment, at least two glycosides or glucosides are used in a stripping composition. Preferably, a stripping composition comprises around 3-6% of a first alkyl polyglucoside, around 2-8% of a second alkyl polyglucoside, and optionally around 0.25-3% of a third alkyl polyglucoside. Most preferably, the first alkyl polyglucoside is a D-glucopyranose, oligomeric, butyl glycoside; the second alkyl polyglucoside is a caprylyl/decyl glucoside; and the third a alkyl polyglucoside is 2-ethylhexylglucoside.

According to still other preferred embodiments, a stripping composition may optionally comprise a thickener or emulsifier or colorant or a combination thereof. Preferably, a thickener or emulsifier comprises around 0.5-2% methylcellulose. A colorant, such as an oil dye (most preferably green) in a minor amount (such as around 0.001%) may also be used.

Ingredients or components for a paint stripper composition according to preferred embodiments of the invention are listed in Table 1 below.

TABLE 1

Preferred Compositions

| Ingredient | Preferred Amount (wt %) | Most Preferred Amount (wt %) |
| --- | --- | --- |
| 1,3 dioxolane | 40-80% | Around 45% |
| Acetic acid methyl ester | 10-25% | Around 20% |
| D-glucopyranose, oligomeric, butyl glycoside | 3-6% | Around 4% |
| 2-aminoethanol | 5-30% | Around 5% |
| Dimethyl carbonate | 10-20% | Around 14.15% |
| Benzene methanol | 5-15% | Around 5% |
| Methylcellulose | 0.5-2% | Around 0.85% |
| Caprylyl/decyl glucoside | 2-8% | Around 5% |

TABLE 1-continued

Preferred Compositions

| Ingredient | Preferred Amount (wt %) | Most Preferred Amount (wt %) |
|---|---|---|
| 2-ethylhexylglucoside | 0.25-3% | Around 1% |
| (Optional) oil green dye | | Around 0.001% |

According to another preferred embodiment, the total amounts of 1,3-dioxolane, acetic acid methyl ester, dimethyl carbonate, and benzene methanol sum to at least 85 volume percent of the total volume of the composition.

Although preferred compositions are useful in stripping other types of coatings, they are particularly well suited to removing water-based coatings.

Figure 1:
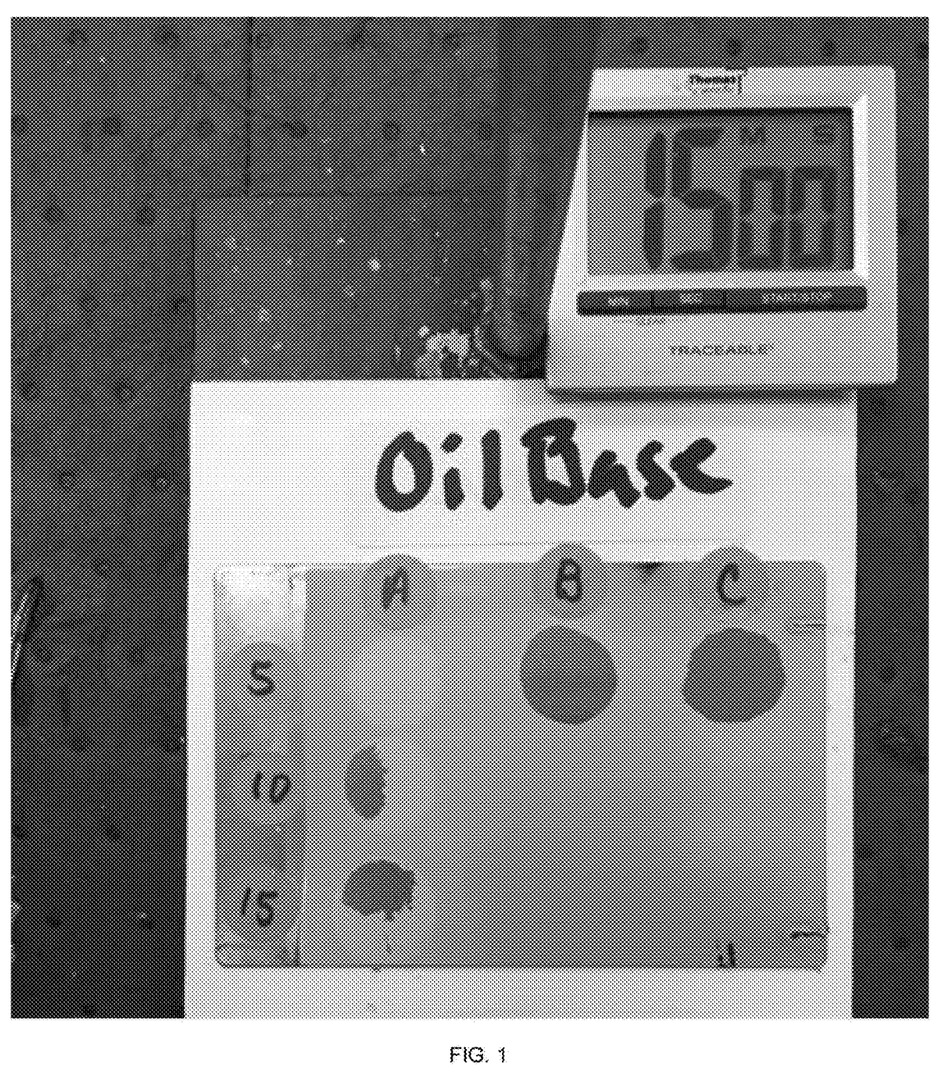
FIG. 1 is a photograph showing results of applying a composition according to a preferred embodiment (Sample B) of the invention compared to two prior art paint stripper compositions (Samples A and C) to an oil base coating.
Figure 2:
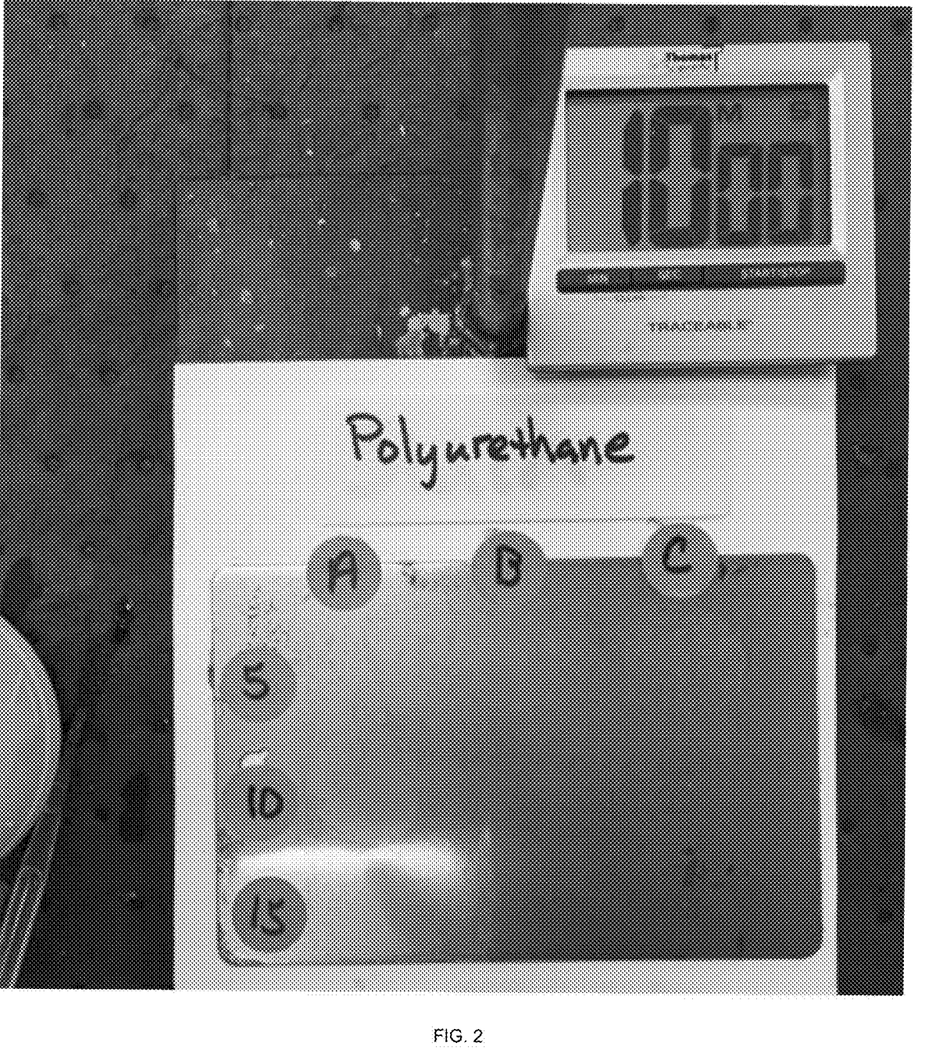
FIG. 2 is a photograph showing results of applying a composition according to a preferred embodiment of the invention (Sample B) compared to two prior art paint stripper compositions (Samples A and C) to a polyurethane coating.
Figure 3:
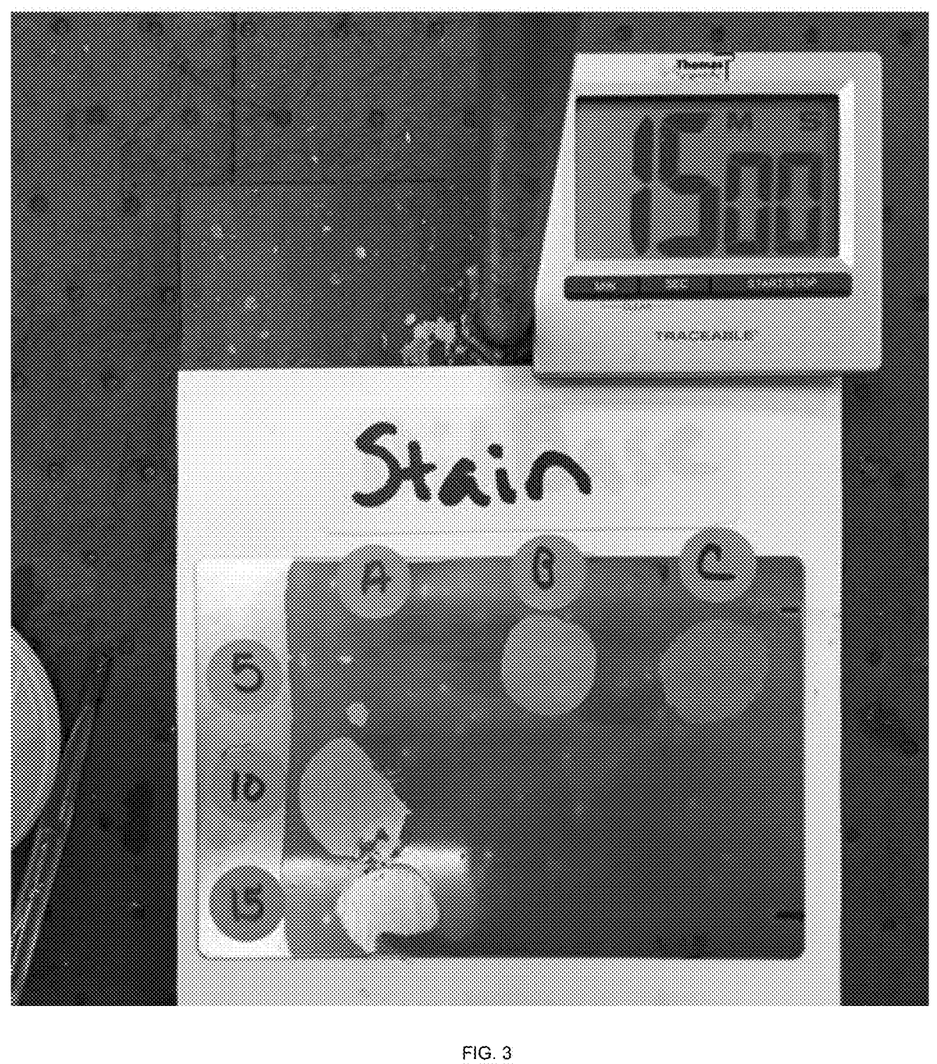
FIG. 3 is a photograph showing results of applying a composition according to a preferred embodiment of the invention (Sample B) compared to two prior art paint stripper compositions (Samples A and C) to a stain coating.
Figure 4:
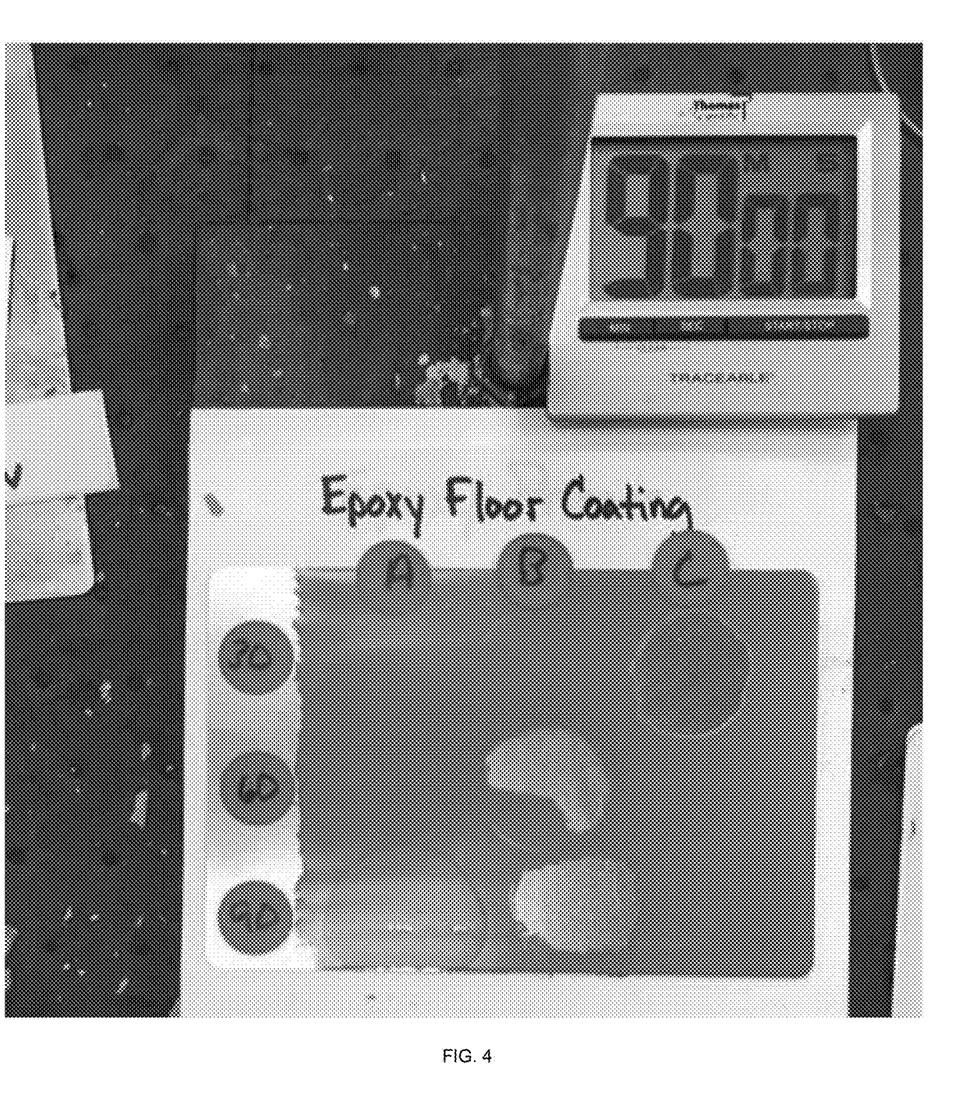
FIG. 4 is a photograph showing results of applying a composition according to a preferred embodiment of the invention (Sample B) compared to two prior art paint stripper compositions (Samples A and C) to an epoxy floor coating.
Figure 5:
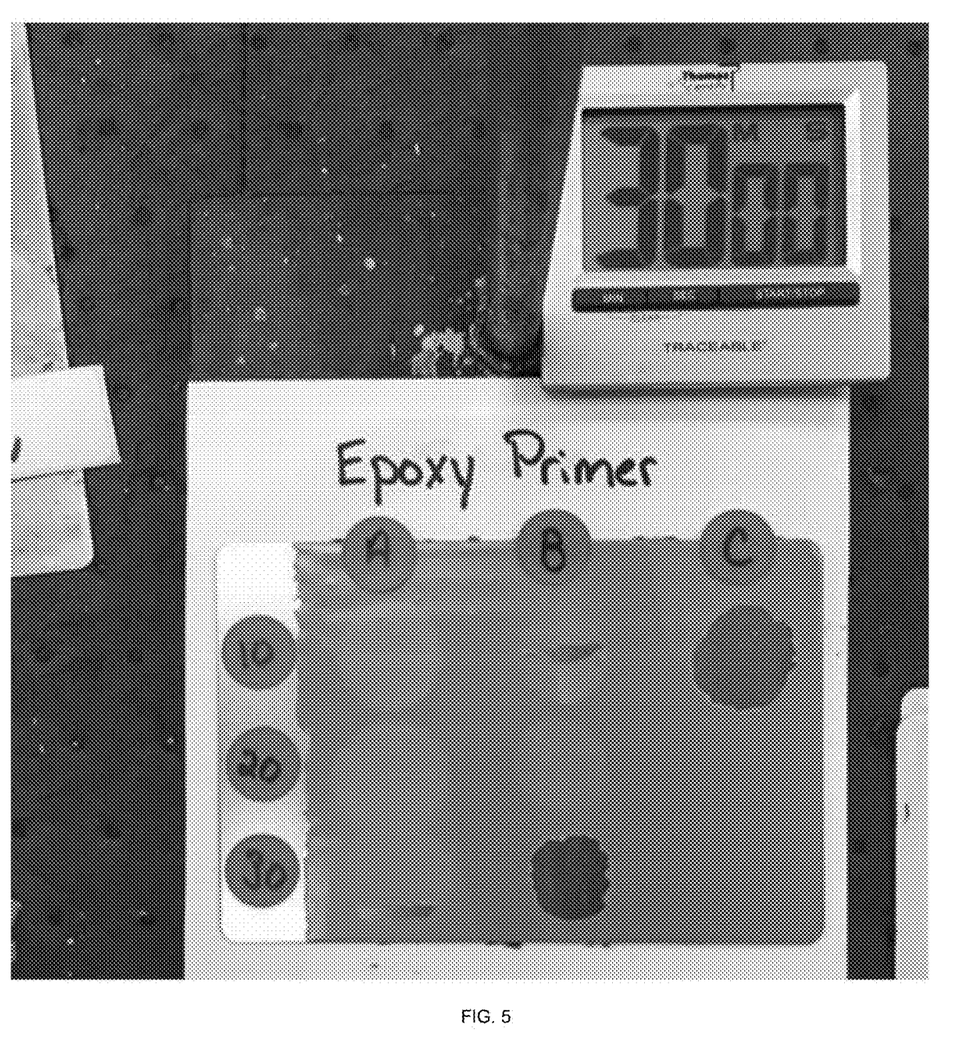
FIG. 5 is a photograph showing results of applying a composition according to a preferred embodiment of the invention (Sample B) compared to two prior art paint stripper compositions (Samples A and C) to an epoxy primer.
Figure 6:
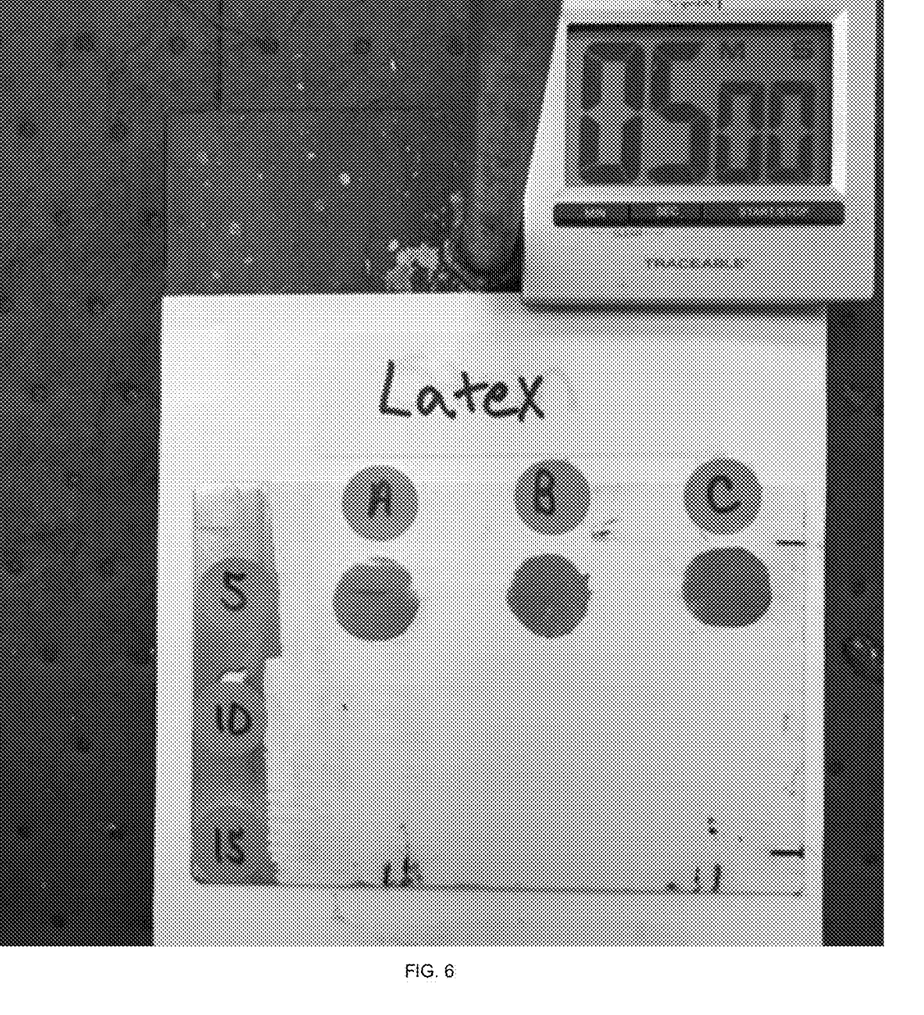
FIG. 6 is a photograph showing results of applying a composition according to a preferred embodiment of the invention (Sample B) compared to two prior art paint stripper compositions (Samples A and C) to a latex coating.

A paint stripper composition (Sample B, containing the ingredients and amounts listed in Table 1) according to a preferred embodiment of the invention was compared to two prior art paint strippers on various types of coatings to determine effectiveness in removing the coating in a short period of time. Sample A contained around 22% hydrogen peroxide, around 29% propylene carbonate, around 48% benzyl alcohol, around 0.5% of an ethoxylated alcohol surfactant, around 0.1% of an anisaldehyde, and around 1% of methylcellulose and did not contain any methylene chloride. Sample C contained around 85% methylene chloride, around 4% methanol, around 6% isopropanol, around 2.6% tall oil fatty acid, around 1% of potassium hydroxide (45%), around 1.4% paraffin wax, and around 0.4% hydroxypropylcellulose. Each of the coatings were applied as a single layer on a metal (steel) Q panel substrate. The coated substrates were then placed in an over at 221 F for 4 hours and then allowed to sit for at least one week before applying any of the test stripping compositions. Each of the stripping compositions, Samples A, B, and C, were then applied to the coatings, allowed to sit for a period of time between 5-90 minutes, and then wiped off to see how much of the coating was removed. The results are shown in FIGS. 1-6, in which an oil base coating (Rust-Oleum® Professional High Performance Protective Enamel Oil Based paint) was used in FIG. 1; an oil-based polyurethane coating (Minwax® Fast-Drying Polyurethane Clear Gloss) was used in FIG. 2; an oil-based stain coating (Minwax® PolyShades® Pecan Gloss) was used in FIG. 3; an epoxy floor coating (Jones-Blair® Neogard® Epoxy Floor Coating) was used in FIG. 4, an epoxy primer (Jones-Blair® Chem-O-Gard Epoxy Primer) was used in FIG. 5, and a latex water-based paint coating (Olympic® Premium Latex Satin) was used in FIG. 6. The elapsed time in minutes is indicated in the left column on each figure. The results are summarized in Table 2 below indicating an approximate percentage of the amount of coating removed.

TABLE 2

Summary of Paint Stripper Comparisons

| Coating | Sample A | Sample B | Sample C |
|---|---|---|---|
| Oil Based | No removal after 5 minutes; Around 50% after 10 minutes; No significant additional removal after 15 minutes | 100% after 5 minutes | 100% after 5 minutes |
| Poly-urethane | No removal after 5 minutes; 100% after 10 minutes | 100% after 5 minutes | 100% after 5 minutes |
| Stain | Around 10% after 5 minutes; Around 90% after 10 minutes; No significant additional removal after 15 minutes | 100% after 5 minutes | 100% after 5 minutes |
| Epoxy Floor | Less than 5% after 90 minutes | Around 60% after 30 minutes; 100% after 60 minutes | 100% after 30 minutes |
| Epoxy Primer | Around 15% after 30 minutes | Almost 100% after 30 minutes | 100% after 10 minutes |
| Latex | 100% after 5 minutes | 100% after 5 minutes | 100% after 5 minutes |

According to one preferred embodiment of the invention, a method of removing a coating from a surface comprises: (1) applying a stripping composition according to a preferred embodiment of the invention to the coating such as by pouring, wiping, or brushing it on the coating or dipping the coated surface into such composition; (2) allowing such composition to sit on the coating for period of time, and then (3) removing the stripping composition and coating by wiping, scraping, rubbing, or sanding after the composition has been in contact with the coating for the period of time. These steps may be repeated if the coating is not satisfactorily removed by a previous application of a stripping composition according to a preferred embodiment of the invention. For water-based coatings (such as paints, stains, and polyurethanes), the period of time is preferably 5-10 minutes. For oil-based coatings (such as paints, stains, and polyurethanes), the effective period of time is preferably 5-10 minutes. For epoxy and other two-part coatings, the effective period of time is preferably around 60-90 minutes for finish coatings and around 20-30 minutes for primer coatings. The compositions according to preferred embodiments may be left on a coating for longer than the preferred periods of time, as these are minimum periods of time for such compositions to effectively remove at least 80%, preferably at least 90%, and most preferably 100% of the coating. The period of time may also change depending on the method of application, amount of composition applied, and/or the thickness of the coating.

Most preferably, it is not necessary to cover the stripping composition to prevent drying during the period of time between the applying and removing steps. It was found that the combination of MEA and glycoside will form a thin layer on the top of the stripping composition according to a preferred embodiment as it dries. This layer helps prevent drying of the stripping composition between the layer and the coating, similar to the addition of wax in some prior art stripping compositions but without the additional processing steps associated with adding wax to prior art formulations. However, the stripping composition may be covered, if desired, with plastic or another material to further reduce drying of the composition (or evaporation or volatilization of the ingredients in the composition) during the period of time between the applying and removing steps.

Amounts described herein are by weight of the composition unless otherwise specifically specified. All amounts for ingredients or ratios of ingredients indicated herein as a range include each individual amount or ratio within those ranges and any and all subset combinations within ranges, including subsets that overlap from one preferred range to a more preferred range. Any ingredient or amount of an ingredient described as included or excluded with any particular preferred embodiment herein may similarly be included or excluded with any other preferred embodiment herein even if not specifically described with such embodiment. Those of ordinary skill in the art will also appreciate upon reading this specification and the description of preferred embodiments herein that modifications and alterations to the methods and compositions may be made within the scope of the invention and it is intended that the scope of the invention disclosed herein be limited only by the broadest interpretation of the appended claims to which the inventors are legally entitled.

What is claimed is:

1. A composition for stripping a coating from a surface, the composition comprising:
    around 40-80% total of one or more ethers;
    around 20-45% total of one or more esters;
    one or more amines;
    around 5-45% total of one or more alcohols; and
    around 0.25-17% total of one or more glycosides;
    wherein all percentages are by weight of the composition.

2. The composition of claim 1 wherein the composition does not include methylene chloride.

3. The composition of claim 1 wherein the one or more ethers comprises 1,3 dioxolane; and
    the one or more esters comprises acetic acid methyl ester, a carbonate ester, or both.

4. The composition of claim 3 wherein the alcohols comprise benzene methanol and 2-aminoethanol and the carbonate ester is dimethyl carbonate.

5. The composition of claim 4 wherein the composition comprises around 5-15% of the benzene methanol and around 5-30% of the 2-aminoethanol, both by weight of the composition.

6. The composition of claim 5 wherein the composition comprises around 10-25% of the acetic acid methyl ester and around 10-20% of the dimethyl carbonate, both by weight of the composition.

7. The composition of claim 6 wherein the composition does not include any methylene chloride.

8. The composition of claim 1 wherein the composition does not include methylene chloride, xylene, toluene, acetone, n-methyl pyrrolidone, wax, or other evaporation retarder.

9. The composition of claim 8 wherein the composition does not include water as a separately added ingredient.

10. The composition of claim 4 wherein the benzene methanol is the only aromatic compound in the composition.

11. A composition for stripping a coating from a surface, the composition comprising:
    around 40-80% total of the one or more ethers;
    around 10-25% total of one of more methyl esters;
    around 10-20% total of one or more carbonate esters;
    around 5-30% of one or more amines; and
    one or more glycosides comprising a butyl glycoside, a decyl glucoside, a 2-ethylhexylglucoside, or a combination thereof; and
    wherein the percentages are all by weight of the composition.

12. The composition of claim 11 further comprising 0.5-2% methylcellulose by weight of the composition and the one or more ethers comprises 1,3 dioxolane.

13. The composition of claim 12 wherein the composition comprises around 5-15% total of an aromatic compound.

14. A method of removing a coating from a surface, the method comprising:
    applying a stripping composition to the coating;
    allowing the stripping composition to contact the coating for a period of time;
    removing the stripping composition and coating from the surface after the period of time;
    wherein the stripping composition comprises one or more ethers, one or more esters, one or more amines, one or more alcohols, and one or more glycosides;
    wherein the period of time is at least 5 minutes for a water-based or oil-based coating and at least 20 minutes for a two-part or epoxy coating; and
    wherein the stripping composition comprises: (1) around 40-80% total of the one or more ethers, (2) around 10-25% total of one of more methyl esters, (3) around 10-20% total of one or more carbonate esters, (4) around 5-15% of the one or more alcohols, (5) around 5-30% of one or more amines; and (6) one or more glycosides comprising a butyl glycoside, a decyl glucoside, a 2-ethylhexylglucoside, or a combination thereof; and
    wherein the percentages are all by weight of the composition.

15. A method of removing a coating from a surface, the method comprising:
    applying a stripping composition to the coating;
    allowing the stripping composition to contact the coating for a period of time;
    removing the stripping composition and coating from the surface after the period of time;
    wherein the stripping composition comprises one or more ethers, one or more esters, one or more amines, one or more alcohols, and one or more glycosides;
    wherein the period of time is at least 5 minutes for a water-based or oil-based coating and at least 20 minutes for a two-part or epoxy coating; and
    wherein it is not necessary to cover the stripping composition to prevent drying during the period of time between the applying and removing steps.

16. The method of claim 14 wherein the stripping composition further comprises methylcellulose and wherein the one or more ethers comprises 1,3 dioxolane.

17. The method of claim 16 wherein the stripping composition does not contain any methylene chloride.

18. The method of claim 17 wherein the alcohols comprise benzene methanol, the amines comprise 2-aminoethanol, the methyl ester comprises acetic acid methyl ester, and the carbonate ester comprises dimethyl carbonate.

* * * * *